United States Patent [19]

Munekata et al.

[11] 4,335,500
[45] Jun. 22, 1982

[54] TOOL STORAGE MAGAZINE FOR MACHINE TOOL

[75] Inventors: Kenichi Munekata, Kariya; Fumihiko Ohkoshi; Yoji Kamiya, both of Anjo; Toshifumi Hasegawa, Kariya, all of Japan

[73] Assignee: Toyoda Koki Kabushiki Kaisha, Kariya, Japan

[21] Appl. No.: 197,674

[22] Filed: Oct. 16, 1980

[30] Foreign Application Priority Data

Oct. 22, 1979 [JP] Japan .............................. 54-136807
Oct. 22, 1979 [JP] Japan .......................... 54-146726[U]

[51] Int. Cl.³ ..................... B23Q 3/157; B23B 29/00; A47F 3/08; B23B 39/20
[52] U.S. Cl. ..................................... 29/568; 82/36 R; 211/1.5; 408/35
[58] Field of Search ............... 82/36 R, 36 A; 29/568; 211/1.5; 408/35

[56] References Cited

U.S. PATENT DOCUMENTS 3,281,935 11/1966 Zankl et al. ..................... 29/568
3,344,512 10/1967 Zucchellini ..................... 29/568

FOREIGN PATENT DOCUMENTS 41-14870 6/1969 Japan ..................... 29/568

Primary Examiner—Harrison L. Hinson
Attorney, Agent, or Firm—Oblon, Fisher, Spivak, McClelland & Maier

[57] ABSTRACT

A tool storage magazine of the type wherein a plurality of tool sockets each for removably storing a cutting tool therein are pivotably carried on an indexable element is provided with an engaging member moved by a hydraulic cylinder for pivoting each tool socket at a tool taking out position from a horizontal position to a vertical position through engagement with a pair of engaging rollers which are rotatably supported by each tool socket and located outside the side faces of each tool socket. The magazine is further provided with a locking mechanism which prevents a holding plunger of any tool socket indexed to the tool taking out position from being disengaged from a tool received in the tool socket until the tool socket is pivoted to its vertical position.

3 Claims, 4 Drawing Figures

4,335,500

TOOL STORAGE MAGAZINE FOR MACHINE TOOL

BACKGROUND OF THE INVENTION

1. Field of the Invention

The present invention relates in general to a tool storage magazine for use in a machine tool with a tool exchange function and more particularly, to a tool storage magazine of the type wherein a plurality of tool sockets each for removably storing a cutting tool therein are pivotably carried on an indexable support element.

2. Description of the Prior Art

Generally, a vertical spindle machine with an automatic tool exchange function is provided with a tool storage magazine of the type wherein a plurality of tool sockets are pivotably carried, each for removably storing a tool therein. In the magazine, the tool sockets are usually held horizontally, and an indexing operation is performed to index to a tool taking out position one of the tool sockets that receives a desired tool therein. In order to take out the tool socket receiving the desired tool from the magazine, it is necessary to pivot at the tool taking out position the tool socket from a horizontal position to a vertical position where it has a parallel relationship with the axis of a tool spindle of the machine tool. A tool exchange operation is subsequently carried out. Accordingly, it is also necessary to provide the tool magazine with a device which prevents the dropping of a tool from any tool socket when the same is pivoted at the tool taking out position.

SUMMARY OF THE INVENTION

It is an object of the present invention to provide an improved tool storage magazine wherein a tool socket is pivoted at a tool taking out position from a horizontal position to a vertical position and vice versa by means of a hydraulic cylinder with a small stroke.

Another object of the present invention is to provide an improved tool storage magazine of the character set forth above wherein a pair of engaging rollers to be moved by the hydraulic cylinder are arranged outside the side faces of the tool socket so as to decrease the distance between the engaging rollers and the pivot axis of the tool socket.

Still another object of the present invention is to provide an improved tool storage magazine capable of preventing the displacement of a tool from a tool socket when the same is pivoted at the tool taking out position.

A further object of the present invention is to provide an improved tool storage magazine wherein any tool is locked on an associated tool socket during a substantial part of the pivotal movement of the tool socket at the tool taking out position, but is automatically unlocked therefrom at a final part of such pivotal movement.

Briefly, according to the present invention, these and other objects are achieved by providing a tool storage magazine for a machine tool, as mentioned below. A plurality of tool sockets each for removably storing a tool therein are selectively indexable to a tool taking out position by rotation about a horizontal axis and pivotable at the tool taking out position. A pair of engaging rollers are rotatably supported by each of the tool sockets and located outside the side faces of each tool socket. A hydraulic cylinder has a piston slidable in a vertical direction and a piston rod connected to the piston. An engaging member is securedly connected to the piston rod and formed with horizontally extending upper and lower portions in such a manner as to permit the pair of engaging rollers of each tool socket to pass therethrough while the plurality of tool sockets are rotated about the horizontal axis. The lower portion of the engaging member is bifurcated to be aligned with the pair of engaging rollers of each tool socket at the tool taking out position and to form a space therebetween which is wider than the width of each tool socket.

In another aspect of the present invention, a holding plunger is slidably received in each tool socket and engageable with a tool stored in the tool socket. A first spring is interposed in each tool socket for urging the holding plunger toward engagement with the tool. A locking member is received in each tool socket to be selectively movable to locking and unlocking positions to prevent and permit disengagement of the holding plunger from the tool, respectively. A second spring is interposed in each tool socket for urging the locking member to the locking position. A second engaging member is provided to move the locking member into the unlocking position against the second spring during pivotal movement of each tool socket from its horizontal position to its vertical position and to restrict pivotal movement of each tool socket to locate each tool socket at its vertical position.

BIREF DESCRIPTION OF THE DRAWINGS

The foregoing and other objects and many of the attendant advantages of the present invention will be readily appreciated as the same becomes better understood by reference to the following detailed description, when considered in connection with the accompanying drawings, in which.

DETAILED DESCRIPTION OF THE PREFERRED EMBODIMENT

Figure 1:
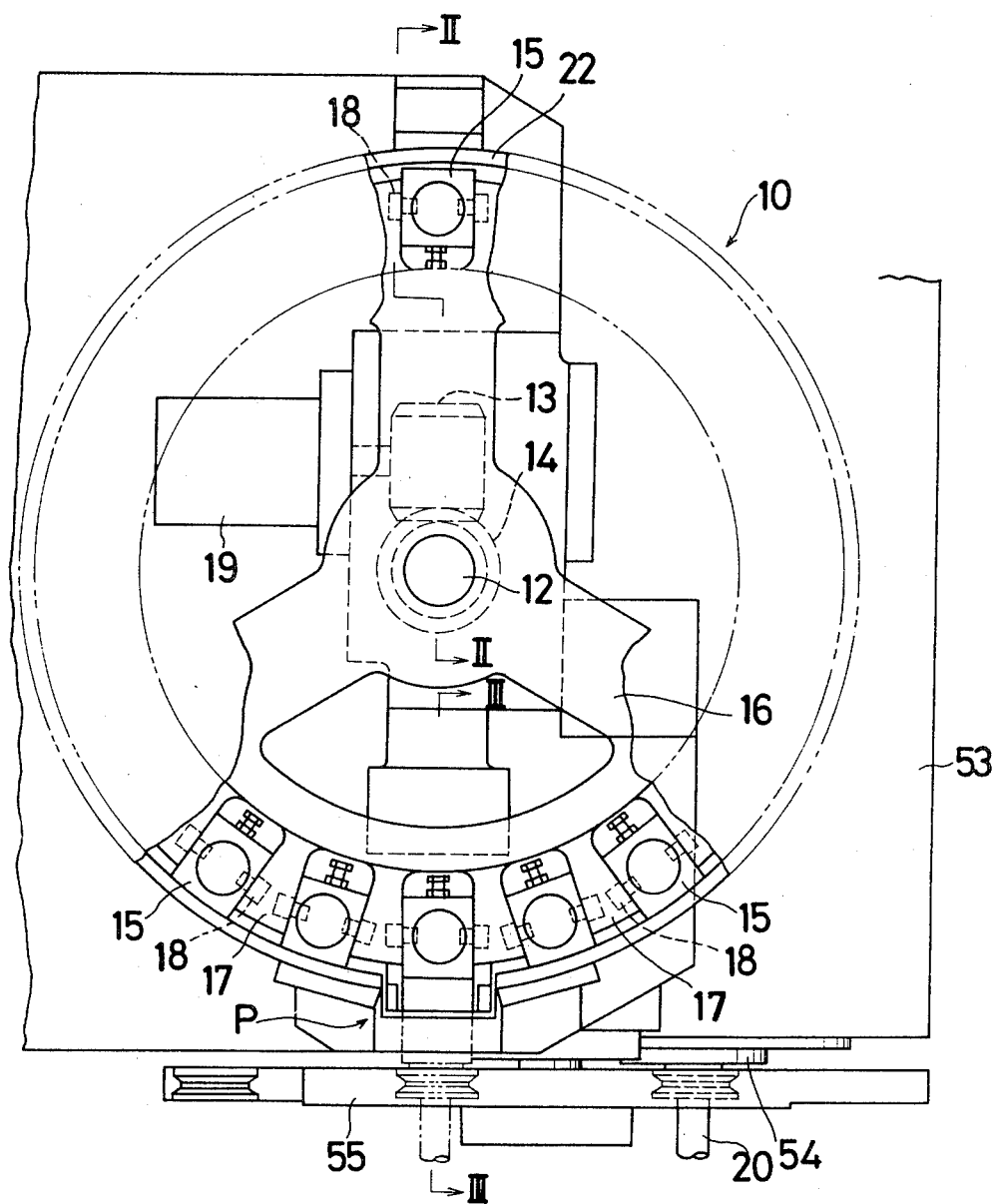
FIG. 1 is a partial front view of a tool storage magazine according to the present invention.
Figure 2:
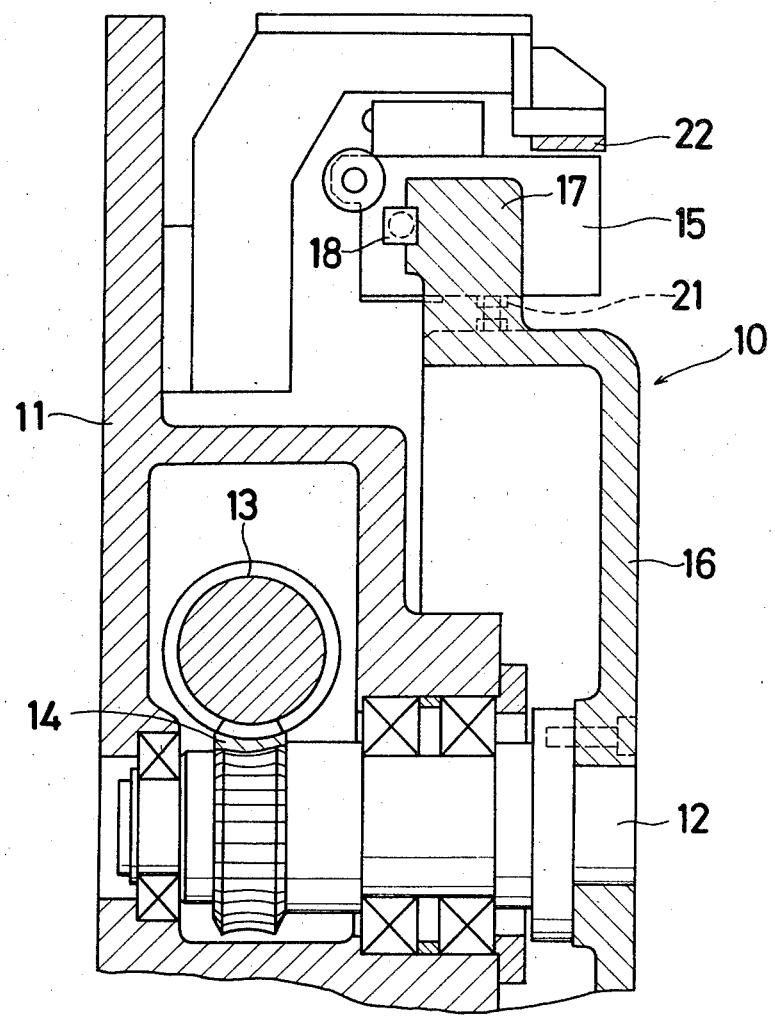
FIG. 2 is an enlarged sectional view taken along the lines II—II in FIG. 1.

Referring now to the drawings, wherein like reference numerals or characters refer to identical or corresponding parts throughout the several views, and more particularly to FIGS. 1 and 2, there is shown a tool storage magazine generally indicated at 10 which is fixedly mounted on the side of a column (not shown) of a vertical type machine tool. The tool storage magazine 10 comprises a magazine base 11 within which a rotary shaft 12 is rotatably supported. The rotary shaft 12 has mounted thereon a worm wheel 14 engaged with a worm 13 which is driven by a motor 19 mounted on the magazine base 11. The rotary shaft 12 has also secured at its one end a circular magazine plate 16 to be rotatably indexed by rotation of the motor 19. A plurality of equally spaced holding blocks 17 are circumferentially arranged on the periphery of the magazine plate 16. Each of a plurality of tool sockets 15 is pivotably supported between two adjacent holding blocks 17 by means of pivot pins 18. In order to maintain each tool socket 15 at a substantially horizontal position during rotation of the magazine plate 16, inner pivotal movement of each tool socket 15 is restricted by a restricting bolt 21 provided on each tool socket 15 to be rested on the outer periphery of the magazine plate 16, while outer pivotal movement of each tool socket 15 is restricted by a guide rail 22 secured to the magazine base 11. The guide rail 22 has a cut-out portion at a tool taking out position P so as to permit pivotal movement of any tool socket 15 indexed at the tool taking out position P.

Figure 3:
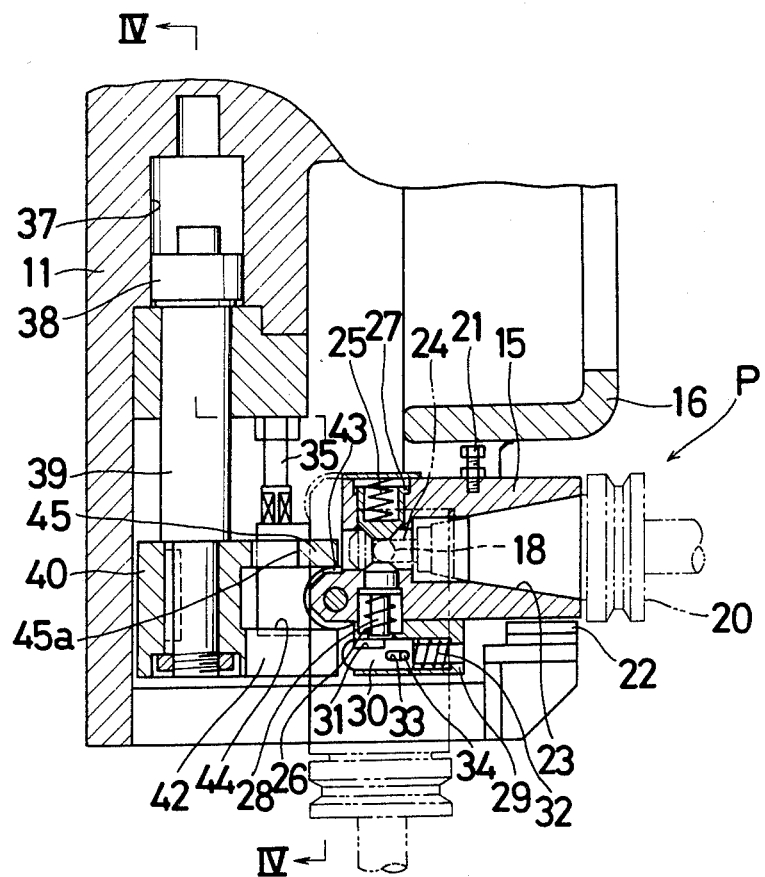
FIG. 3 is an enlarged sectional view taken along the lines III—III in FIG. 1.

As shown in FIG. 3, each tool socket 15 is formed with a tapered bore 23 into which a tool 20 is removably inserted. A pair of holding plungers 27 and 28 are received in each tool socket 15 for movement in a radial direction thereof and are biased by means of springs 25 and 26 for engagement with a pull stud 74 protruding from one end of each tool 20. One of the pair of holding plungers, for example, 28 is protruded into a block 29 secured to each tool socket 15. A locking pin 30 is slidably received in the block 29 in parallel relationship with the axis of each tool socket 15 and has a recess 31 on the periphery thereof. A spring 32 is interposed between the block 29 and the locking pin 30 for urging the locking pin 30 to such a locking position as to present the periphery of the locking pin 30 onto the sliding path of the holding plunger 28. The locking pin 30, when so presented, serves to obstruct the retraction of the holding plunger 28, so that the tool 20 being received in a tool socket 15 at the tool taking out position P can be prevented from falling therefrom during pivotal movement of the tool socket 15. An engaging member 35 is secured to the magazine base 11 for engagement with one end of the locking pin 30 at the end of pivotal movement of the tool socket 15 to move the locking pin 30 into an unlocking position against the spring 32 and for abutment with the block 29 to locate the tool socket 15 at a vertical position. When the locking pin 30 is moved into unlocking position, the recess 31 of the locking pin 30 is aligned with the sliding path of the plunger 28 so as to permit removal of the tool 20 from the tool socket 15. A stationary pin 34 is secured to the block 29 and is engaged with a keyway 33 formed on the locking pin 30 so as to restrict sliding movement of the locking pin 30 and prevent rotation of the locking pin 30.

Figure 4:
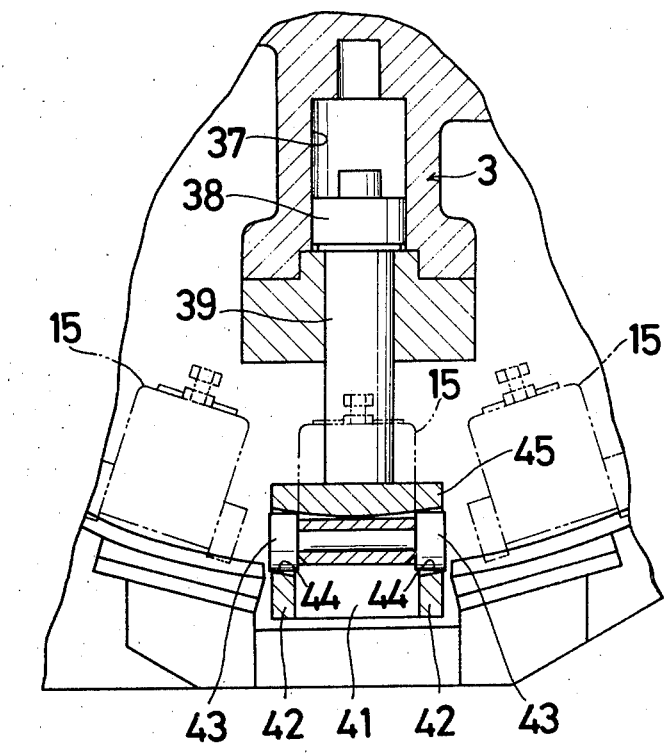
FIG. 4 is a sectional view taken along the lines IV—IV in FIG. 3.

The magazine base 11 is formed with a socket pivoting cylinder 37 at the rear of the tool socket 15 at the tool taking out position. A piston 38 is received in the cylinder 37 for a vertical sliding movement and has a piston rod 39 to which an engaging member 40 is secured. The engaging member 40 is bifurcated into horizontally extending upper and lower portions 45 and 42 to form a space 44 therebetween, as shown in FIG. 3. The upper portion 45 of the engaging member 40 is formed with a through hole 45a to permit passage of the locking pin 30 therethrough during pivotal movement of a tool socket 15 at the tool taking out position P. As shown in FIG. 4, the lower portion 42 of the engaging member 40 is also bifurcated to form a space 41 which is a little wider than the width of the tool socket 15 to prevent interference of the tool socket 15 with the engaging member 40 during pivotal movement of the tool socket 15. A pair of engaging rollers 43 are rotatably supported by each tool socket 15 and located outside the side faces of the tool socket 15. The engaging rollers 43 of any tool socket 15 at the tool taking out position are engageable outside the side faces of the tool socket 15 with the lower portion 42 of the engaging member 40 located at its lower position. The space 44 between the upper and lower portions 45 and 42 of the engaging member 40 is formed a little larger than the diameter of the engaging roller 43 to permit free passage of the engaging rollers 43 of each tool socket 15 therethrough during indexing operation of the tool storage magazine 10.

Referring back to FIG. 1, reference numeral 53 indicates a spindle head mounted on the front of the column (not shown) to be slidable in a vertical direction. A tool spindle 54 is received in the spindle head 53 to be rotatable about a vertical axis and removably holds a tool 20 at its lower end. A tool exchange arm 55 is supported by an arm support member (not shown) secured to the rear of the magazine base 11 to be rotatable and axially slidable for exchanging tools between a vertically oriented tool socket 15 at the tool taking out position P and the tool spindle 54 in a well known manner.

The operation of the tool storage magazine 10 according to the present invention is described hereunder. While a machining operation is being performed on a workpiece by a tool 20 in the tool spindle 54, the magazine plate 16 is rotated by the motor 19 to index a tool 20 to be next used to the tool taking out position P. When a tool socket 15 carrying the next used tool 20 is indexed to the tool taking out position P, rotation of the magazine plate 16 is stopped and this state is maintained until the machining operation to completed by the tool 20 in the tool spindle 54.

When the machining operation is completed by the tool 20 in the tool spindle 54, the spindle head 53 is moved upwardly to a predetermined position for a tool exchange operation, and at the same time, a tool socket 15 being indexed to the tool taking out position P is pivoted. More specifically, pressurized fluid is supplied to the lower cylinder chamber of the cylinder 37 to move the piston 38 and the engaging member 40 upwardly. Accordingly, the tool socket 15 at the tool taking out position P, whose rollers 43 are sandwiched between the upper and lower portions 45 and 42 of the engaging member 40, is pivoted about the pivot pins 18 from its horizontal position indicated in solid lines to its vertical position indicated in phantom lines in FIG. 3.

During the indexing rotation of the magazine plate 16 and the pivotal movement of the tool socket 15 at the tool taking out position P, the holding plunger 28 of each tool socket 15 is aligned with the periphery of the locking pin 30 so as to be restricted from being moved outwardly, which thus prevents the tool 20 from falling from the tool socket 15. However, when the tool socket 15 at the tool taking out position P is pivoted into its vertical position, the one end of the locking pin 30 is moved into abutting engagement with the engaging member 35 to align the recess 31 of the locking pin 30 with the holding plunger 28 of the tool socket 15 to permit removal of the tool 20 from the tool socket 15. Furthermore, the end of the block 29 is engaged with the engaging member 35 to restrict the pivotal movement of the tool socket 15. Even if the recess 31 of the locking pin 31 is aligned with the holding plunger 28, the tool 20 in the tool socket 15 does not fall down from the tool socket 15 due to its own weight, since the holding plungers 27 and 28 are urged by the springs 25 and 26.

When the spindle head 54 is moved upwardly to the predetermined position and the tool socket 15 at the tool taking out position P is pivoted to its vertical position, the tool change arm 55 is operated to exchange the tools 20 between the tool spindle 54 and the tool socket 15 in the well known manner.

When the tool exchange operation is completed by the tool change arm 55, the spindle head 53 is moved downwardly to perform a next machining operation and the tool socket 15 at the tool taking out position P is swung back by the operation of the cylinder 37 from its vertical position to its horizontal position. When the tool socket 15 is swung back, the locking pin 30 is disengaged from the engaging member 35 and thus axially moved to its locking position to restrict outward movement of the holding plunger 28.

As described above, according to the present invention, the pair of engaging rollers 43 are rotatably supported by each tool socket 15 and located outside the side faces of the tool socket 15, whereby it is possible to decrease the distance between the engaging rollers 43 and the pivot axis 18 of each tool socket 15 to thereby permit the small stroke operation of the cylinder 37.

Furthermore, according to the present invention, the locking pin 30 is provided on each tool socket 15 to prevent retraction of the holding plunger 28 in engagement with the pull stud of the tool 20, whereby it is possible to positively prevent any tool 20 from falling from its associated tool socket 15 during the indexing and pivotal movement of the tool socket 15.

Obviously, numerous modifications and variations of the present invention are possible in light of the above teachings. It is to be understood, therefore, that within the scope of the appended claims, the invention may be practiced otherwise than as specifically described herein.

What is claimed is:

1. A tool storage magazine for a machine tool comprising:
    a plurality of tool sockets, each for removably storing a tool therein, selectively indexable to a tool taking out position by rotation about a horizontal axis and pivotable at said tool taking out position;
    a pair of engaging rollers rotatably supported by each of said tool sockets and located outside the side faces of each tool socket;
    a hydraulic cylinder having a piston slidable in a vertical direction and a piston rod connected to said piston;
    an engaging member securely connected to said piston rod and formed with horizontally extending upper and lower portions in such a manner as to permit said pair of engaging rollers of each tool socket to pass therethrough while said plurality of tool sockets are rotated about said horizontal axis;
    said lower portion of said engaging member being bifurcated to be aligned with said pair of engaging rollers of each tool socket at said tool taking out position and to form a space therebetween which is wider than the width of each tool socket.

2. A tool storage magazine as claimed in claim 1, wherein each tool socket comprises:
    a holding plunger slidably received in said tool socket and engageable with a tool stored in said tool socket;
    first spring means in said tool socket for urging said holding plunger toward engagement with said tool;
    a locking member received in said tool socket to be selectively movable to locking and unlocking positions to prevent and permit disengagement of said holding plunger from said tool, respectively;
    second spring means in said tool socket for urging said locking member to said locking position, and wherein a second engaging member is provided to move said locking member into said unlocking position against said second spring means during pivotal movement of each tool socket from its horizontal position to its vertical position and to restrict pivotal movement of each tool socket to locate each tool socket at its vertical position.

3. A tool storage magazine as claimed in claim 2, wherein said upper position of said engaging member is formed with a through hole to permit passage of said locking member therethrough during pivotal movement of an associated tool socket at the tool taking out position.

* * * * *